Feb. 3, 1970   R. L. McHUGH   3,492,951
CRUST MAKER
Filed May 20, 1968

INVENTOR
RICHARD L. McHUGH

United States Patent Office

3,492,951
Patented Feb. 3, 1970

3,492,951
CRUST MAKER
Richard L. McHugh, New York, N.Y., assignor to Standard Brands Incorporated, New York, N.Y., a corporation of Delaware
Filed May 20, 1968, Ser. No. 730,321
Int. Cl. A47j *43/00*
U.S. Cl. 107—47     3 Claims

ABSTRACT OF THE DISCLOSURE

A pastry shell forming device formed of sheet plastic. Generally triangular nodules, integral with the outer forming surface, inhibit individual crumb migration in cookie crumb crusts. The nodules also space the device from a pie plate side to regulate crust thickness.

---

This invention relates to pastry shell forming devices and more particularly to a device for forming crusts in pie plates, tins and other mold-like receptacles.

The device exhibits special utility in the preparation of pie crust made from cookie crumbs of the type often used in instant, no-bake, pie mixes. In general, such pie crusts are finished by mixing the cookie crumbs with softened solid fat and refrigerating to set the crust and do not require a great deal of working and accordingly very little force is required to position or work the cookie crumb-solid fat mixture into the form of a pie crust.

The prior art is aware of devices which may be employed for forming a pie crust, such implements generally working on a mass of dough which is placed in a pie pan, as exemplified by U.S. Patent No. 2,543,682 to Warfel. In this prior artifact, a generally triangular and wedge-shaped block of wood or the like is provided with an upper handle by which the fabricator works and tamps the dough into a relatively thin sheet and then presses it against the peripheral segments of a pie pan. In general, however, such devices are not especially adaptable or suitable for the new widely used instant pie mixes, particularly those employed for domestic and individual consumers. For example, devices such as the noted Warfel implement do not provide a means for inhibiting movement or shifting of the crumbs during the pressing of the crumb dough into the configuration dictated by the geometry of the pie plate. Further, such devices do not include a means for governing the thickness of the rim segments of the dough, a relatively greater critical factor because of the nature of the crumb dough.

According to the present invention, a pastry crust forming device is fabricated from a relatively light material such as plastic and may be readily included in a box of instant crust mix while occupying a minimum of volume within the container. The shaping device of this invention also exhibits nodules which not only inhibit crumb shifting during the forming process but perform the additional function of gauging the thickness of the peripheral portion of the pie crust.

A still third function of such nodules is a pre-weakening or scored function which facilitates equal angular fractures in a pie crust.

These and other advantages of the present construction will be apparent to those working in the pastry arts from the following description.

Figure 1:
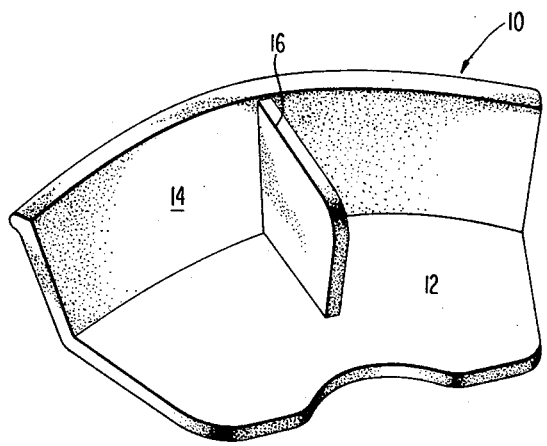
FIGURE 1 is a perspective view of the pastry forming implement of the invention.

Turning now to the drawings, the numeral 10 denotes generally the pastry shell forming implement of this invention and is preferably formed of sheets of a plastic material. The device is generally arcuate and includes a basal portion 12 integral with an upstanding and canted segment 14, the latter in the general form of a strip and adapted to perform a pressing function. The angular extent is about 30° as a convenient width, a secant across the base being about 10 centimeters. A handle 16 functions to allow grasping of the device by the user and also to maintain the cant between the base and the rim 14. An adhesive, such as an epoxy resin, may be employed to join the sheet handle 16 to the base and rim.

Figure 3:
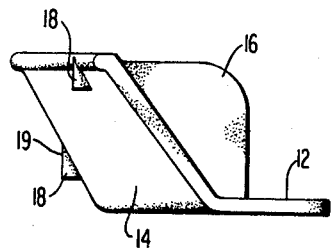
FIGURE 3 is a side elevational view of implement of FIGURE 1.
Figure 2:
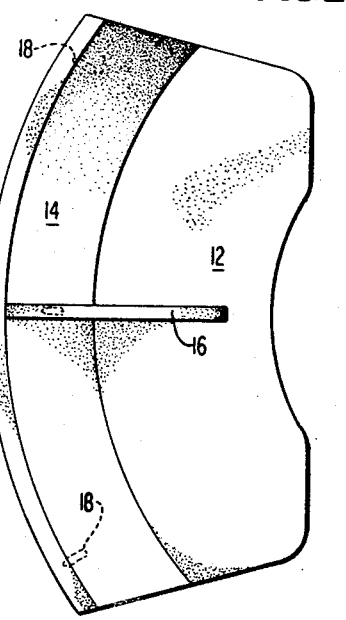
FIGURE 2 is a top plan view of the implement of FIGURE 1.

At preferably equal angular intervals along the outer (left portion of FIGURE 3) surface of the rim, several integral and struck out nodules 18 are positioned. Each is generally wedge-shaped, being integrally joined to the surface of the rim along an edge of the wedge. Their spacing is indicated in FIGURE 2 of the drawings. Alternate nodules 18 are at different levels of the rim, the middle nodule being lower than the two outer ones and the nodule tips are thus non-collinear. The outermost tips of each nodule are spaced from the outer rim surface by equal amounts. The tips function as abutments to space the rim from the inner rim or sides of a pie plate or the like. This spacing feature may be seen by reference to FIGURE 4 of the drawings now to be more fully described.

Figure 4:
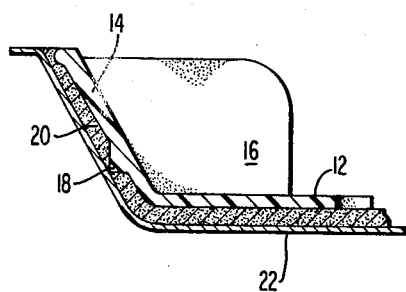
FIGURE 4 is a mid-sectional view of the implement of FIGURE 1, showing its relation to a pastry crust.

In the formation of a pastry crust from cookie crumbs, as fashioned from the so-called instant pie mixes now readily available commercially for domestic consumption, cookie crumbs or the like are formed into pastry shell by pressing an aggregate formed from them against the bottom and sides of a pastry mold, such as a pie plate. FIGURE 4 illustrates such a process wherein the numeral 20 represents a pastry shell which is to be formed from cookie crumbs and wherein the numeral 22 represents a pie plate of conventional configuration. The user of the implement of this invention grasps the sheet handle 16 and rather gently presses against the cookie crumbs with the basal portion 12 of the implement. This continues until the entire base or central portion of the pastry crust is formed. At this time, the outer or peripheral portion of the crust 20 is to be formed by pressing the cookie crumb matrix between the outer rim of the pie plate 22 and the rim portion 14 of the subject implement. It will be observed that the nodules 18 function to space the rim 14 from the corresponding rim of the pie plate. This insures a uniform thickness of the crust at the rim, this being a portion of the crust which is particularly noticeable to the consumer when the pie is cut. It will further be observed that the spacing nodules 18 function, by virtue of their upstanding outer edges 19, to preclude shifting movement of the crumbs as the device pushes the rim portion of the shell towards the outer part of the pie pan 22. Each nodule 18 thus functions in a manner somewate analyogous to a gripping device for precluding relative slippage between the rim portion 14 and the peripheral portion of the pastry shell. It will further be observed that by virtue of the different levels of the median nodule 18 and the two outer nodules that the rim 14 does not rock relative to the edge of the pie plate 22.

What is claimed is:

1. A pastry shell forming device comprising
   (a) a pressing element having a curved surface of generally uniform width and having integral projections extending outwardly therefrom thereby providing abutments capable of penetrating a pastry shell and contacting the inner rim of a pie plate to space said curved surface from the inner rim of said pie plate and provide a uniform thickness of crust at the rim, said surface being of an angular extent less than half of a circle, (b) a basal element integrally connected with said pressing element, said basal element having a planar surface merging with and into an edge of said curved surface at an angle not less than ninety degrees and not greater than a half circle, (c) a handle secured to said basal portion and upstanding therefrom.

2. The shell forming device of claim 1 wherein (a) said integral projections each extend the same distance away from said curved surface, (b) said integral projections each having an edge the projection of which intersects the plane of the basal element, (c) said handle being in the form of a sheet, the plane of the sheet being at right angles to the plane of the basal element, (d) the outermost tips of said integral projections being non-collinear to thereby define a non-rocking action when the device is pushed against the sides of a pie plate.

3. The device of claim 1 wherein said pressing element, said basal element and said handle are each formed of sheet material.

References Cited

UNITED STATES PATENTS

| | | | |
|---|---|---|---|
| 704,867 | 7/1902 | Dews | 107—50 XR |
| 2,346,839 | 4/1944 | Hariss et al. | 99—439 XR |
| 2,543,682 | 2/1951 | Warfel | 107—47 |
| 2,691,337 | 10/1954 | Forrest | 99—433 |

WALTER A. SCHEEL, Primary Examiner

ARTHUR O. HENDERSON, Assistant Examiner